ELECTRICAL DEVICE
Filed Oct. 24, 1956
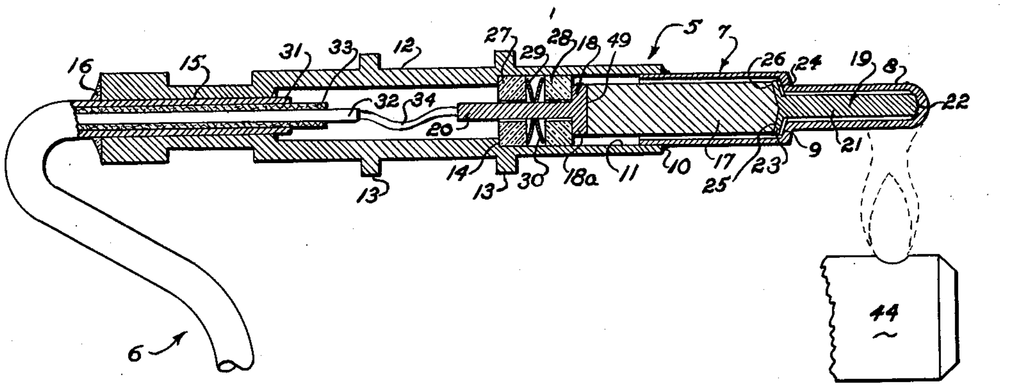
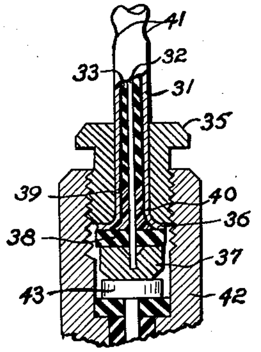
INVENTORS
Robert W. Fritts &
Sebastian Karrer
BY Seegert & Schwalbach
Att'ys United States Patent Office 3,022,361

Patented Feb. 20, 1962

3,022,361

ELECTRICAL DEVICE

Robert W. Fritts, Elm Grove, Wis., and Sebastian Karrer, Port Republic, Md., assignors, by mesne assignments, to Minnesota Mining and Manufacturing Company, St. Paul, Minn., a corporation of Delaware Filed Oct. 24, 1956, Ser. No. 618,063
6 Claims. (Cl. 136—4)

This invention relates to improvements in electrical devices and more particularly to low power electrical devices utilizing pressure type electrical contacts therein.

In the development of electrical devices, particularly thermoelectric generators utilizing semi-metallic thermoelements, it has been found desirable from the standpoint of economical manufacture to utilize a pressure type contact for making an electrical connection to the semi-metallic element. Because of the relatively small magnitude of the electrical energy produced by a thermoelectric generator, it is imperative that the resistance at such a pressure contact be as low as possible and remain at this low value throughout the life of the device. Such a requirement is, of course, incompatible with the formation of a relatively high resistance film, for example an oxide film, on the interface of the pressure contact.

Accordingly, it is a general object of the present invention to provide an improved electrical device wherein a pair of electrical elements having surface portions in low resistance electrical contact are enclosed within an enclosure, and wherein means is provided for preventing the formation of high resistance films on said electrical elements in spite of the presence within said enclosure of a substance, for example moisture, which, if reacted with one of said elements, would form thereon a high resistance film tending to deleteriously affect the electrical resistance of said pressure contact.

Another object of the invention is to provide an improved electrical device of the aforementioned character wherein advantage is taken of the effect of temperature upon the tendency toward formation of films within the enclosure by providing said enclosure with a temperature gradient affording zones of different temperature within said enclosure, and by locating the contacting portions of the electrical elements in a temperature zone within said enclosure which is less favorable for reaction of said elements with film-forming material than is the temperature of another of said zones remote from said contacting portions, so that formation of any films tends to take place in said remote zone rather than on said contacting portions of the electrical elements.

Still another object of the invention is to provide an improved electrical device of the class described wherein protection of the electrical elements from oxidation is provided by having the enclosure member comprised of material which is oxidizable at the normal temperature thereof to form a refractory oxide, i.e., an oxide which is very stable at high temperatures and is not reducible by hydrogen, and by having the electrical elements comprised of material which, if oxidizable at the normal temperature thereof, form an oxide which is more readily reducible at its normal temperature than said refractory oxide is at its normal temperature, wherefore reaction of any moisture within the enclosure with said enclosure member forms refractory oxides thereon and releases hydrogen for reduction of any oxides of the material of the electrical elements, said reduction, in turn releasing oxygen in the form of water vapor for reaction with said enclosure member to form additional refractory oxides thereon.

A more specific object of the invention is to provide an electrical device of the character described which takes the form of a thermoelectric generator wherein the enclosure member is a sheath-like thermoelement having an end portion adapted to be exposed to a source of heat to afford the temperature gradient therein, and wherein the electrical elements thereof take the form of a contact electrode extending inwardly from said end portion and a second thermoelement having a low resistance pressure contact with said contact electrode affording a "hot" junction therebetween.

Another specific object of the invention is to provide an electrical device of the aforedescribed character wherein only non-hygroscopic insulating materials are used to thereby reduce the likelihood of moisture within the enclosure.

Still another object of the invention is to provide an electrical device of the class described wherein the enclosure means is provided with a reducing fill affording, during operation of the device, free hydrogen which is available for the reduction of any oxides of the electrical elements.

Other objects and advantages of the invention will become apparent as the description proceeds, reference being had to the drawing accompanying and forming part of this specification, the illustrated embodiment of the invention taking the form of a thermoelectric generator. In the drawing:

The sole FIGURE is an elevational view, partly in longitudinal section, showing a thermocouple and lead assembly constructed in accordance with the teachings of the present invention.

Referring more particularly to the drawing, the illustrated thermocouple and lead assembly comprises a thermocouple 5 and a coaxial type lead 6 which together form an hermetically sealed envelope or enclosure means as will hereinafter appear. The thermocouple 5 comprises a first thermoelement 7 in the form of a tubular sheath member having a reduced diameter outer end portion 8 providing an internal annular shoulder 9. The sheath member 7 is fixed, as by silver soldering or brazing at 10, within a counterbore 11 formed in an end portion of a mounting or extension sleeve 12, the latter being formed with suitable external shoulder means 13 for coaction with mounting means (not shown) for the generator 5. The counterbore 11 provides an annular internal shoulder 14, and the opposite end of the sleeve 12 is formed with a portion of reduced internal diameter 15 to snugly receive one end of the coaxial lead 6, said lead being sealed therein, as by silver soldering or brazing at 16.

Coaxially disposed within the enclosure afforded by the sheath member 7 and the sleeve 12 is a second thermoelement 17 in the form of a cylindrical ingot. The thermoelement 17 is provided with contact electrodes 18 and 19 for effecting electrical connection therewith, the electrode 18 preferably having a fused or bonded electrical connection with the thermoelement 17 at 49, and having an elongated stem portion 20 extending coaxially within the sleeve 12 as shown.

The contact electrode 19 has an elongated stem portion 21 extending coaxially in spaced relation with respect to the reduced diameter portion 8 of the sheath 7, and is joined at its outer end to the outer end of said reduced diameter sheath portion, as by welding at 22 which provides a fused electrically and thermally conductive connection therebetween. The contact electrode 19 also has an enlarged head portion 23 seated against the annular shoulder 9 of the sheath member 7. The head portion 23 is preferably formed with means, for example radial grooves 24 in the surface thereof abutting shoulder 9, affording communication between the interior of the larger diameter portion of the sheath member 7 and the interior of the reduced diameter sheath portion 8, for a purpose to be hereinafter described.

The head portion 23 of the electrode 19 is also preferably formed with a concave conical contacting surface 25 for receiving the adjacent complementary convex conical contacting end surface 26 formed on the end of the thermoelement 17.

Disposed between the head portion 18*a* of the contact electrode 18 and the internal annular shoulder 14 of the sleeve 12 are a pair of insulating bushings 27 and 28, and a pair of compression springs 29 and 30 in the form of centrally apertured concavo-convex spring washers. The contact electrode stem 20 extends through the bushings 27 and 28 and washers 29 and 30 as shown, and the compression springs 29 and 30 bias the bushing 27 against the shoulder 14 and the bushing 28 against the head 18*a* of contact electrode 18, thereby placing the thermoelement 17 under axial compression between the electrodes 18 and 19. The bushings 27 and 28 maintain the electrode stem 20, and thereby the adjacent end of the thermoelement 17 centered within the sleeve 12, and the coaction of the conical surfaces 25 and 26 on the thermoelement 17 and electrode 19, respectively, maintains the outer end of said thermoelement centered within the sheath member 7 under the aforementioned compression. The pressure contact between the surface 26 of the thermoelement 17 and the surface 25 of the electrode 19 affords a low resistance electrical connection between said thermoelement and contact electrode which functions as a "hot" thermojunction in the operation of the generator 5.

The coaxial type thermoelectric generator lead 6 comprises a metallic tubular outer conductor 31 and a coaxial inner conductor 32 insulated therefrom by an insulating sleeve 33 preferably made of non-hygroscopic material. The lead 6 affords means for connecting the thermoelectric generator 5 into an external circuit. The inner conductor 32 of the lead 6 is connected in circuit with the contact electrode 20 by a flexible conductor 34, and the outer conductor 31 of lead 6 is connected in circuit with the sleeve 12 by the brazed or welded seal 16 aforementioned. The end of the lead 6 remote from the generator 5 carries a connector nut 35, and the outer tubular lead conductor 31 is radially outwardly flared, as at 36, for engagement by the end of said nut. The inner lead conductor 32 has a low resistance electrical connection with a terminal tip member 37, and a relatively rigid insulating spacer 38 surrounds the inner lead conductor 32 and is interposed between the tip 37 and the flange 36 to insulate said tip from said flange while at the same time maintaining a predetermined minimum spacing between said flange and tip. The spacer 38 may be of fibrous glass bonded with melamine or other suitable material.

The insulation 33 between the inner and outer lead conductors 31 and 32 terminates short of the flange 36, as at 39. Surrounding the inner lead conductor 32 within the outer lead conductor 31 and between the insulating washer 38 and the end portion 39 of the insulation 33, is an insulating seal 40 of pliable material, for example silicone rubber, which directly contacts both the inner and outer lead conductors. Prior to the connection of the lead 6 to the generator 5, and after the terminal tip 37 is fixed to the end of the inner conductor 32 following placement of the seal 40 and insulating spacer 38 on the conductor 32, an axial pull is exerted on the inner conductor to draw the spacer 38 and tip 37 toward the flange 36 and thereby force the pliable seal 40 into the adjacent end of outer conductor 31 and into sealing engagement with both the inner conductor 32 and said outer conductor. While the inner conductor is thus under tension, the outer conductor is crimped, as at 41, to frictionally clamp the inner conductor 32 through the insulation 33. This clamping engagement maintains the portion of the inner conductor between the crimped portions 41 and the tip 37 under continuous tension so that the seal 40 is continuously pressed by the spacer 38 to maintain a continuous hermetic seal between the conductors 31 and 32.

By virtue of the seal 40 and the aforedescribed sealing connections at 10 and 16 between the sheath 7 and the tube 12, and between the tube 12 and outer conductor 31, respectively, an hermetically sealed envelope is provided which encloses a thermoelectric generator element 17 and contact electrodes 18 and 19, said envelope comprising said outer tubular conductor 31, sleeve 12, and sheath member 7. This envelope or enclosure means preferably contains a reducing fill, for example methane or other suitable hydrocarbon gas affording, when heated, hydrogen which tends to reduce oxidation within the aforementioned enclosure means.

The lead 6 is connected into an external circuit by threading the connector nut into a complementary lead connector socket 42 having a terminal tip 43 insulatably mounted therein for contact by the terminal tip 37 in a manner well known in the art. Tightening of the nut 35 in the socket 42 compressively stresses the sealing material 40 within the outer tubular conductor 41 between the insulation 33 and the insulating spacer 38, thus causing said material to further intimately contact all of the surfaces confining the same, thereby insuring an hermetic seal between the conductors 31 and 32.

The thermoelement 17 is preferably a semi-metallic element and may be formed, for example, of an alloy further described in the copending application of Sebastian Karrer, Serial No. 475,540, filed December 15, 1954, now Patent No. 2,811,570, and assigned to the assignee of the present application, said alloy comprising lead and at least one member of the group tellurium and selenium. For example, the thermoelement 17 of lead-selenium-tellurium composition could include a selenium-tellurium constituent in which the selenium is but a trace. In this case such constituent should constitute 35% to 38.05% by weight of the composition, the balance (61.95% to 65% by weight) being lead. At the other extreme, where the selenium-tellurium constituent consists almost entirely of selenium with but a trace of tellurium, such constituent should comprise 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

With regard to the aforementioned compositions it will be observed that in each case there is an excess of lead over and above the amount thereof necessary for satisfying the stoichiometric proportions of the compound formed in the second constituent or constituents, i.e., the tellurium or selenium. For example, the composition consisting substantially of lead and selenium can contain up to 10.4% lead by weight of the total composition over and above the 72.41% by weight lead stoichiometrically necessary for combination with selenium.

The electrical characteristics of the aforementioned semi-metallic alloys, desirable, for example in thermoelectric generator elements, can be markedly and advantageously altered in a reproducible manner by the addition thereto of controlled amounts of matter other than the constituents of the base composition. Such additions may also be denominated "beneficial impurities," as distinguished from undesirable impurities. For convenience, these additions are hereinafter designated "promoters," since they tend to enhance the electrical characteristic desired for the particular application of the base compositions.

The abovedescribed base compositions exhibit negative thermoelectric power and negative conductivity. By the addition of certain "promoters," such negative properties may be enhanced, while the polarity of the electrical properties of the base composition may be reversed by the addition of certain other promoters to provide a semi-metallic composition having positive electrical characteristics. Suitable negative promoters are bismuth, tantalum, zirconium, titanium, gallium, bromine and iodine; while suitable positive promoters are sodium and potassium. The copending application of Robert W. Fritts and Sebastian Karrer, Serial No. 475,488, filed on December 15, 1954, now Patent No. 2,811,571, and assigned to the assignee of the present application, gives a complete description of the beneficial impurities, including both departures from perfect stoichiometry and promoters, which have been found to be effective for improvement of electrical properties of the semi-metallic thermoelectric generator elements when added to the aforementioned base compositions in minor amounts. For example, up to a maximum of 6.9% by weight of beneficial impurity, including 3.9% excess lead and 3.0% promoter.

The proportions and ranges of the various constituents aforementioned, and particularly the minimum limits of lead constituent in the compositions, must be regarded as critical if the composition is to have the electrical and physical properties desired. If the lead content is significantly less than the minimum amount indicated for any particular selenium-tellurium proportion, the polarity of the Seebeck E.M.F. changes, and the desired electrical and mechanical properties will not be reproducible. On the other hand, if the lead content of any composition appreciably exceeds the aforementioned maximum limits, the resulting composition is too metallic in nature to afford satisfactory energy conversion efficiencies.

Not only are the proportions and ranges of the aforedescribed compositions to be considered critical, but so also is the purity. More specifically, the limit of tolerable metallic impurity in non-promoted final compositions has been found to be of the order of 0.01%, and the composition must be substantially oxygen-free, if the mechanical and electrical properties desired are to be obtained and are to be reproducible. In the case of promoted compositions, however, the limit of tolerable impurities is 0.001%.

As aforementioned, the juncture of the surfaces 25 and 26 of the electrode 19 and thermoelement 17, respectively, constitutes the hot thermojunction of the thermocouple 7, and it is important that said interface be kept free of films, for example oxide films tending to add resistance to the thermoelectric circuit at this point. To this end, the teachings of the present invention take advantage of the effect of temperature upon the tendency of materials to oxidize. In the illustrated thermocouple 5, the reduced diameter sheath portion 8 and the contact electrode stem 21 comprise heat probe means adapted to receive heat, for example from burning fuel at a pilot burner shown fragmentarily at 44 and juxtaposed with respect to thermocouple 5. Heating of the thermocouple adjacent the outer end of the reduced diameter portion 8 thereof as shown affords a temperature gradient within the sheath 7 and sleeve 12 providing a relatively high temperature at the outer end of the reduced diameter portion 8 of the sheath member 7, with gradually decreasing temperatures at points inwardly therefrom. Thus, the temperature at the juncture of the surfaces 25 and 26 is lower than the temperature at the outer end of the portion 8, but is nevertheless sufficiently high for proper current generation.

Oxidation takes place more readily at higher temperatures than at lower temperatures, and therefore oxidation within the generator 5, for example by reaction with moisture therein, tends to take place most rapidly at the highest temperature zone within said generator. Thus, on occurrence of moisture within the aforementioned enclosure, said moisture tends to react with the portions of the contact electrode 19 and sheath 7 within the reduced diameter sheath portion 8, the portion of the sheath referred to and with which the moisture reacts being identifiable as the exposed inner surface portions of the enclosure or sheath member 7 located beyond the contacting surface 26 of the thermoelement 17 in the direction of the contact electrode 19. The reaction takes place within the reduced diameter sheath portion 8, rather than at the interface of said electrode and the thermoelement 17, which interface is located relatively remote from the point of application of heat to the heat probe means. In this manner, the aforementioned interface is protected against the formation of any oxide films thereon.

The invention utilizes still further means for the protection of the interface of the hot junction, said protection being affected by the proper selection of materials from which the contact electrode 19 and the sheath 7 are made. To this end, the outer sheath member 7 is preferably made of an alloy steel containing a metal that on oxidation forms a "refractory" oxide, i.e., an oxide that is very stable at high temperatures and is not reducible by hydrogen. Examples of such material are chromium, beryllium, zirconium and titanium. On the other hand, the contact electrode 19 is preferably formed of material which will not react with the semi-metallic thermoelement 17, and which if oxidized forms an oxide which is more readily reducible at normal operating temperatures than is the aforementioned refractory oxide. Suitable materials from which the contact electrode 19 may be made are iron, molybdenum and alloys of iron and molybdenum, each of said materials preferably having only the normal minute amounts of residual impurity therein.

In the operation of a generator 5 in which the sheath member 7 contains, for example chromium, and the contact electrode 19 is made, for example of iron, the occurrence of moisture within the enclosure afforded by the couple 5 and lead 6, initiates a continuous cycle of chemical reactions which eventually results in the deposition of all of the oxygen of said moisture on the inner surface portion of the reduced diameter portion 8 of the sheath 7 as chromic oxide, i.e., $Cr_2O_3$. Chromic oxide is a refractory oxide, and storage thereof within the sheath portion 8 has no deleterious effect upon the operation of the generator 5. More specifically, the aforementioned cycle of chemical reactions is as follows: upon occurrence of moisture within the enclosure, oxidation by reaction with said moisture tends to take place most rapidly at the hottest point within the enclosure, i.e., the zone within the reduced portion 8 of sheath member 7, said moisture reacting with the chromium of said sheath member 7 to form chromic oxide and release hydrogen. The released hydrogen, in turn, reacts with any oxide of the iron of the contact electrode 19 which might have formed by reaction with the moisture, reducing said oxide to pure iron and releasing water which, in turn, reacts with the chromium of the sheath member 7 to form additional refractory oxide within the reduced diameter portion 8. Hydrogen is again released by the formation of the aforementioned refractory oxide and is available for further reduction of any remaining oxides of the contact electrode 19, and the cycle continues until all of the oxygen is stored within the reduced diameter portion 8 of the sheath 7 as a scale or film of chromic oxide, and to some extent iron oxide, i.e., FeO. The limited amount of iron oxide which may be present is formed by oxidation of the iron of either the sheath member 7 or stem portion 21 of the contact electrode 19.

In the absence of moisture within the enclosure afforded by the generator 5 and lead 6, any oxide of the contact electrode 19 or of the thermoelement 17 which may be present following fabrication of the generator 5 is reduced by reaction with reducing fill for said enclosure which, during normal operation affords free hydrogen for reaction with said oxides to form pure iron or semimetal, as the case may be, and water. The water thus formed reacts with the chromium of the sheath member 7 within the reduced diameter portion 8 thereof to form refractory oxides in the manner aforedescribed.

It is apparent from the foregoing that the invention affords means for maintaining the interface of a low resistance pressure contact in a thermoelectric generator or the like free of oxide films tending to deleteriously affect the resistance of said pressure contact. The structure is highly efficient, and the simplicity of its construction renders the latter not only inexpensive, but also well adapted for economical fabrication.

The specific illustration and corresponding description are used for the purpose of disclosure only, and are not intended to impose unnecessary limitations on the claims, or to confine the present invention to a particular use. Various changes and modifications may be made without departing from the spirit of the invention, and all of such changes are contemplated as may come within the scope of the appended claims.

What is claimed as the invention is:

1. A thermoelectric generator comprising a semi-metal thermoelement having a contacting surface, a contact electrode of metal compatible with said semi-metal and having a contacting surface, an hermetically sealed enclosure for said thermoelement and contact electrode, said enclosure including as part thereof an enclosure member having a fused electrically and thermally conductive connection with said contact electrode, and biasing means placing said thermoelement and electrode contacting surfaces in continuous low electrical resistance pressure contact, said enclosure member being made of a metal oxidizable to form a refractory oxide and having a surface portion exposed within said enclosure beyond said thermoelement contacting surface in the direction of said contact electrode, the metal of said contact electrode being oxidizable to form an oxide which is more readily reducible than said refractory oxide, wherefore upon occurrence of moisture within said enclosure, reaction thereof with said enclosure member forms refractory oxide and liberates hydrogen which, upon reaction with any oxide of the metal of said contact electrode, reduces said last-mentioned oxide to thereby protect the interface of said pressure contact therefrom and minimize the electrical resistance of said pressure contact.

2. A thermoelectric generator comprising a semi-metal thermoelement having a contacting surface, a contact electrode of metal selected from the group consisting of iron and molybdenum and having a contacting surface, an hermetically sealed enclosure for said thermoelement and contact electrode, said enclosure including as part thereof an enclosure member having a fused electrically and thermally conductive connection with said contact electrode, and biasing means placing said thermoelement and electrode contacting surfaces in continuous low electrical resistance pressure contact, said enclosure member being made of an iron alloy containing a minor amount of metal selected from the group consisting of chromium, beryllium, zirconium and titanium oxidizable to form a refractory oxide and having a surface portion exposed within said enclosure beyond said thermoelement contacting surface in the direction of said contact electrode, the metal of said contact electrode being oxidizable to form an oxide which is more readily reducible than said refractory oxide, wherefore upon occurrence of moisture within said enclosure, reaction thereof with said enclosure member forms refractory oxide and liberates hydrogen which, upon reaction with any oxide of the metal of said contact electrode, reduces said last-mentioned oxide to thereby protect the interface of said pressure contact therefrom and minimize the electrical resistance of said pressure contact.

3. A thermoelectric generator comprising a semi-metal first thermoelement having a contacting surface, a contact electrode of metal compatible with said semi-metal and having a contacting surface, an hermetically sealed enclosure for said thermoelement and contact electrode, said enclosure including as part thereof a second thermoelement having a fused electrically and thermally conductive connection with said contact electrode, and biasing means placing said first thermoelement and electrode contacting surfaces in continuous low electrical resistance pressure contact, said second thermoelement being made of a metal oxidizable to form a refractory oxide and having a surface portion exposed within said enclosure beyond said first thermoelement contacting surface in the direction of said contact electrode, the metal of said contact electrode being oxidizable to form an oxide which is more readily reducible than said refractory oxide, wherefore upon occurrence of moisture within said enclosure, reaction thereof with said second thermoelement forms refractory oxide and liberates hydrogen which, upon reaction with any oxide of the metal of said contact electrode, reduces said last-mentioned oxide to thereby protect the interface of said pressure contact therefrom and minimize the electrical resistance of said pressure contact.

4. A thermoelectric generator comprising a semi-metal first thermoelement having a contacting end surface, a contact electrode of metal compatible with said semi-metal and having a contactting surface, an hermetically sealed enclosure for said thermoelement and contact electrode, said enclosure including as part thereof a tubular second thermoelement surrounding said first thermoelement in spaced relation and having an end portion in fused electrically and thermally conductive connection with said contact electrode, and biasing means placing said first thermoelement and electrode contacting surfaces in continuous low electrical resistance pressure contact, said second thermoelement being made of a metal oxidizable to form a refractory oxide and having a surface portion exposed within said enclosure beyond said first thermoelement contacting surface in the direction of said contact electrode, the metal of said contact electrode being oxidizable to form an oxide which is more readily reducible than said refractory oxide, wherefore upon occurrence of moisture within said enclosure, reaction thereof with said second thermoelement forms refractory oxide and liberates hydrogen which, upon reaction with any oxide of the metal of said contact electrode, reduces said last-mentioned oxide to thereby protect the interface of said pressure contact therefrom and minimize the electrical resistance of said pressure contact.

5. A thermoelectric generator comprising a semi-metal first thermoelement having a contacting surface, a contact electrode of metal selected from the group consisting of iron and molybdenum and having a contacting surface, an hermetically sealed enclosure for said thermoelement and contact electrode, said enclosure including as part thereof a second thermoelement having a fused electrically and thermally conductive connection with said contact electrode, and biasing means placing said first thermoelement and electrode contacting surfaces in continuous low electrical resistance pressure contact, said second thermoelement being made of an iron alloy containing a minor amount of a metal selected from the group consisting of chromium, beryllium, zirconium and titanium oxidizable to form a refractory oxide and having a surface portion exposed within said enclosure beyond said first thermoelement contacting surface in the direction of said contact electrode, the metal of said contact electrode being oxidizable to form an oxide which is more readily reducible than said refractory oxide, wherefore upon occurrence of moisture within said enclosure, reaction thereof with said second thermoelement forms refractory oxide and liberates hydrogen which, upon reaction with any oxide of the metal of said contact electrode, reduces said last-mentioned oxide to thereby protect the interface of said pressure contact therefrom and minimize the electrical resistance of said pressure contact.

6. A thermoelectric generator comprising a semi-metal first thermoelement having an end surface, a contact electrode of metal selected from the group consisting of iron and molybdenum and having an end surface, an hermetically sealed enclosure for said thermoelement and contact electrode, said enclosure including as part thereof a tubular second thermoelement surrounding said first thermoelement in spaced relation and having an end portion in fused electrically and thermally conductive connection with the other end of said contact electrode, biasing means placing said first thermoelement and electrode end surfaces in continuous low electrical resistance pressure contact, said second thermoelement being made of an iron alloy containing a minor amount of a metal selected from the group consisting of chromium, beryllium, zirconium and titanium oxidizable to form a refractory oxide and having a surface portion exposed within said enclosure adjacent said other end of said contact electrode and beyond said first thermoelement end surface in the direction of said contact electrode, the metal of said contact electrode being oxidizable to form an oxide which is more readily reducible than said refractory oxide, and a reducing gas fill for said enclosure, wherefore upon occurrence of moisture within said enclosure, reaction thereof with said second thermoelement forms refractory oxide and liberates hydrogen, reaction of said hydrogen and said fill with any oxide of said semi-metal and of the metal of said contact electrode, reduces said last-mentioned oxides to thereby protect the interface of said pressure contact therefrom and minimize the electrical resistance of said pressure contact.

References Cited in the file of this patent

UNITED STATES PATENTS

| | | |
|---|---|---|
| 511,245 | Mestern | Dec. 19, 1893 |
| 1,651,750 | Brophy | Dec. 6, 1927 |
| 2,012,465 | Godecke | Aug. 27, 1935 |
| 2,154,131 | Lederer | Apr. 11, 1939 |
| 2,175,695 | Kniepen | Oct. 10, 1939 |
| 2,232,961 | Milnes | Feb. 25, 1941 |
| 2,626,970 | Hunrath | Jan. 27, 1953 |
| 2,691,056 | Wolff | Oct. 5, 1954 |
| 2,783,290 | Kile | Feb. 26, 1957 |
| 2,802,894 | Schneider et al. | Aug. 13, 1957 |
| 2,811,569 | Frederick et al. | Oct. 29, 1957 |
| 2,858,350 | Fritts et al. | Oct. 28, 1958 |
| 2,892,591 | Matthews | June 30, 1959 |

FOREIGN PATENTS

| | | |
|---|---|---|
| 154,454 | Great Britain | Dec. 2, 1920 |